Figure 22:
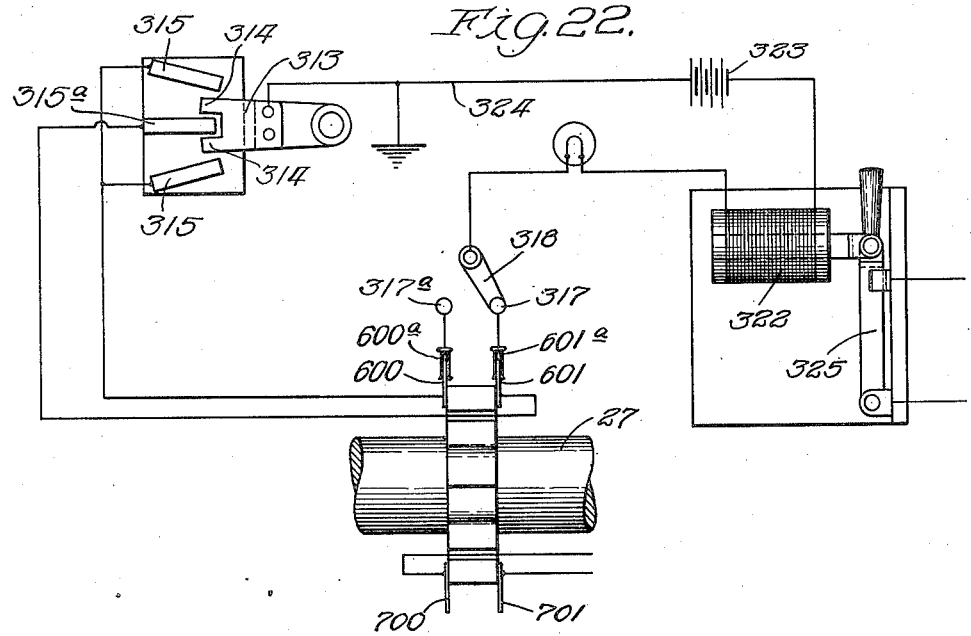

Jan. 31, 1939.   E. C. McFARLANE   2,145,520
GATHERING MACHINE
Filed March 11, 1937   17 Sheets-Sheet 1
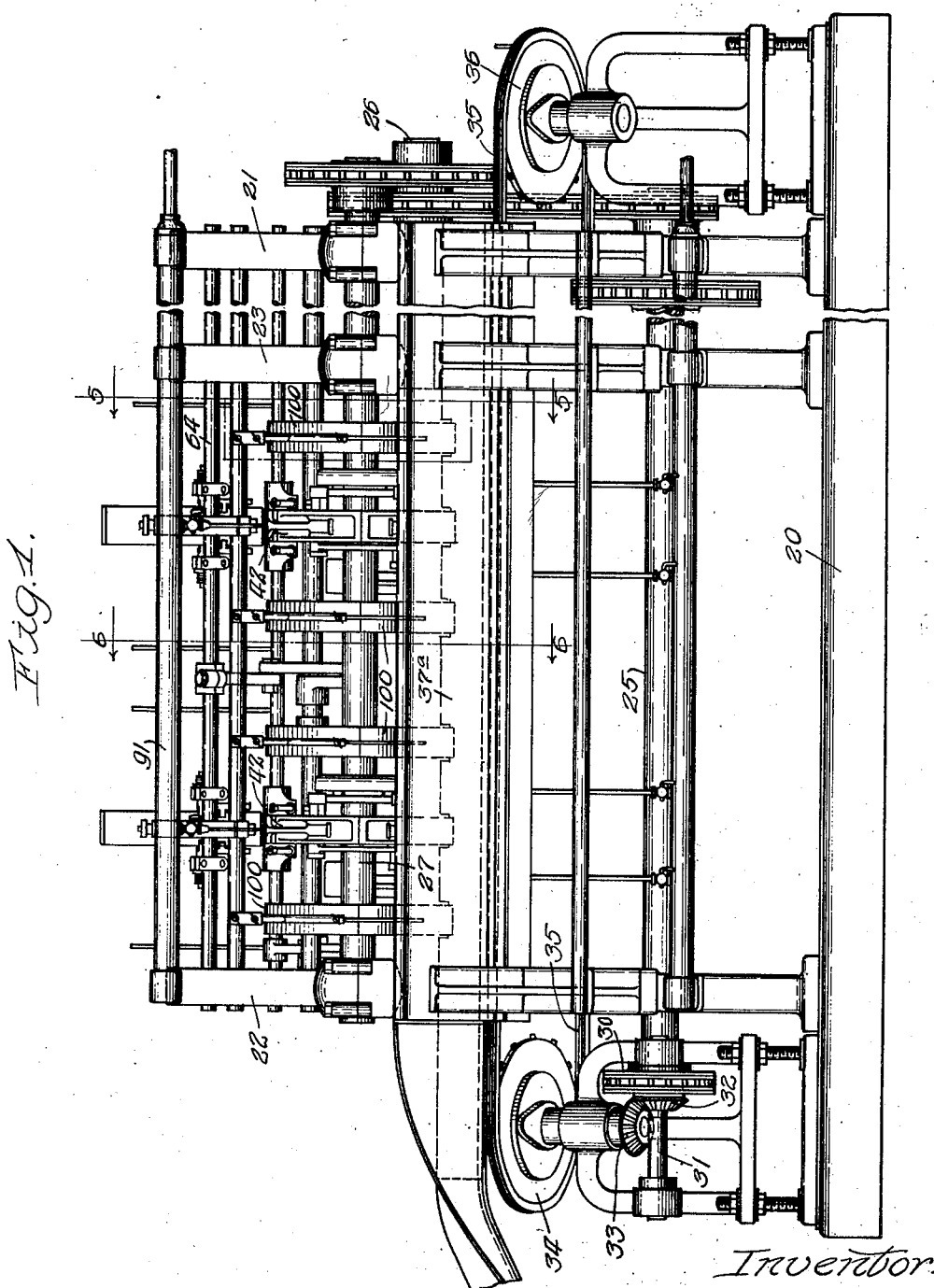

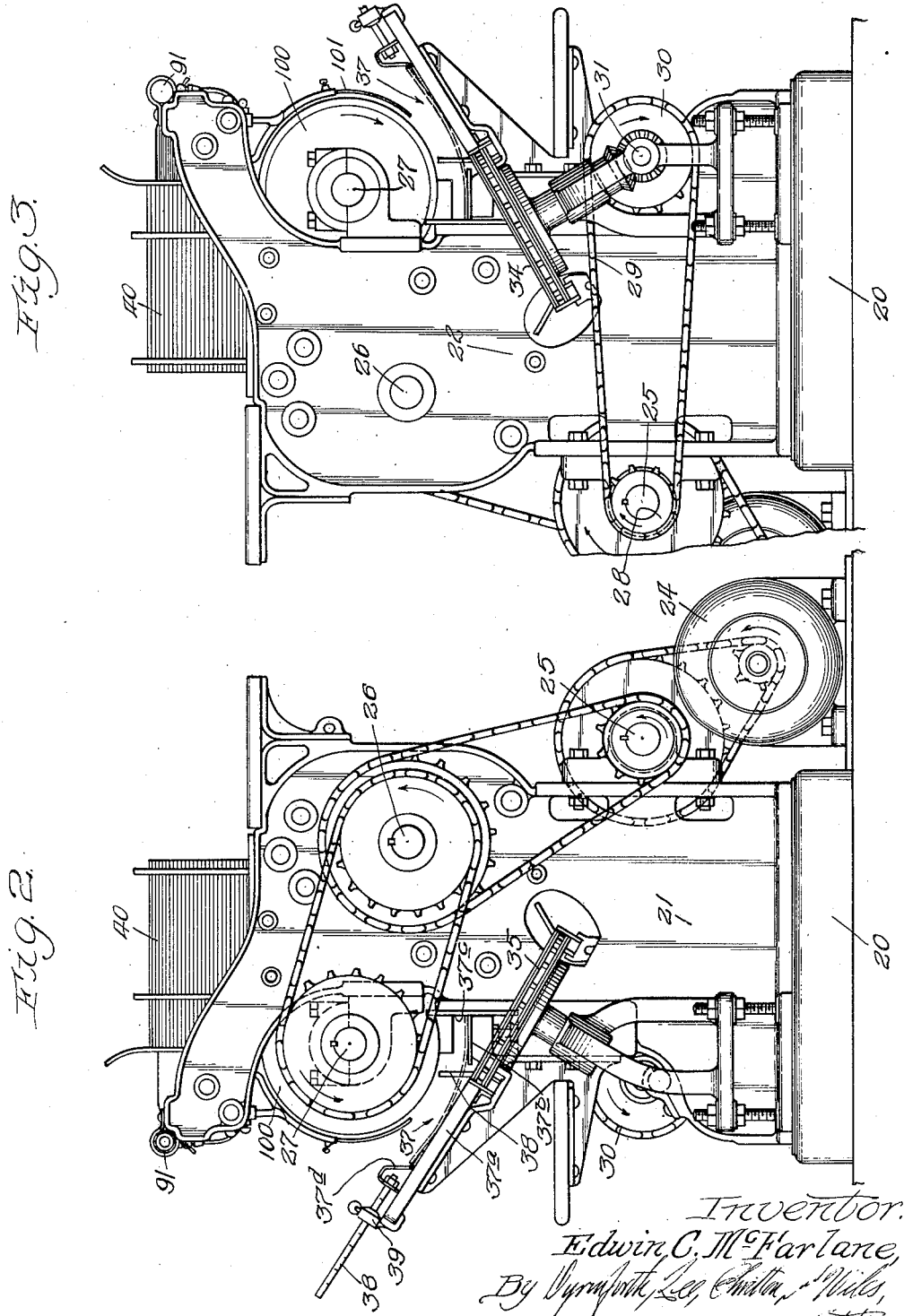

Jan. 31, 1939.  E. C. McFARLANE  2,145,520
GATHERING MACHINE
Filed March 11, 1937   17 Sheets-Sheet 3
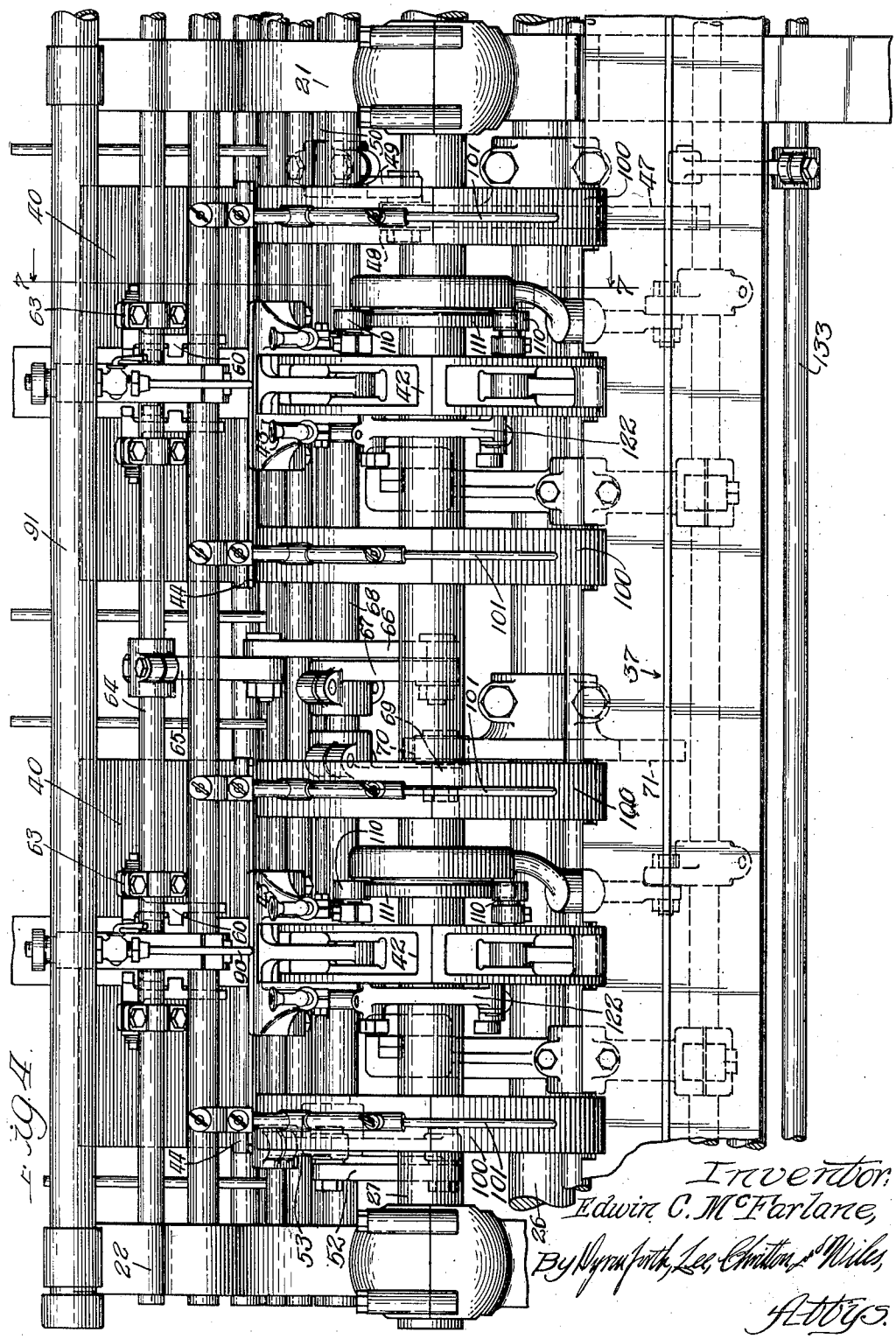
Inventor:
Edwin C. McFarlane,
By Byrnforth, Lee, Chritton & Wiles,
Attys.

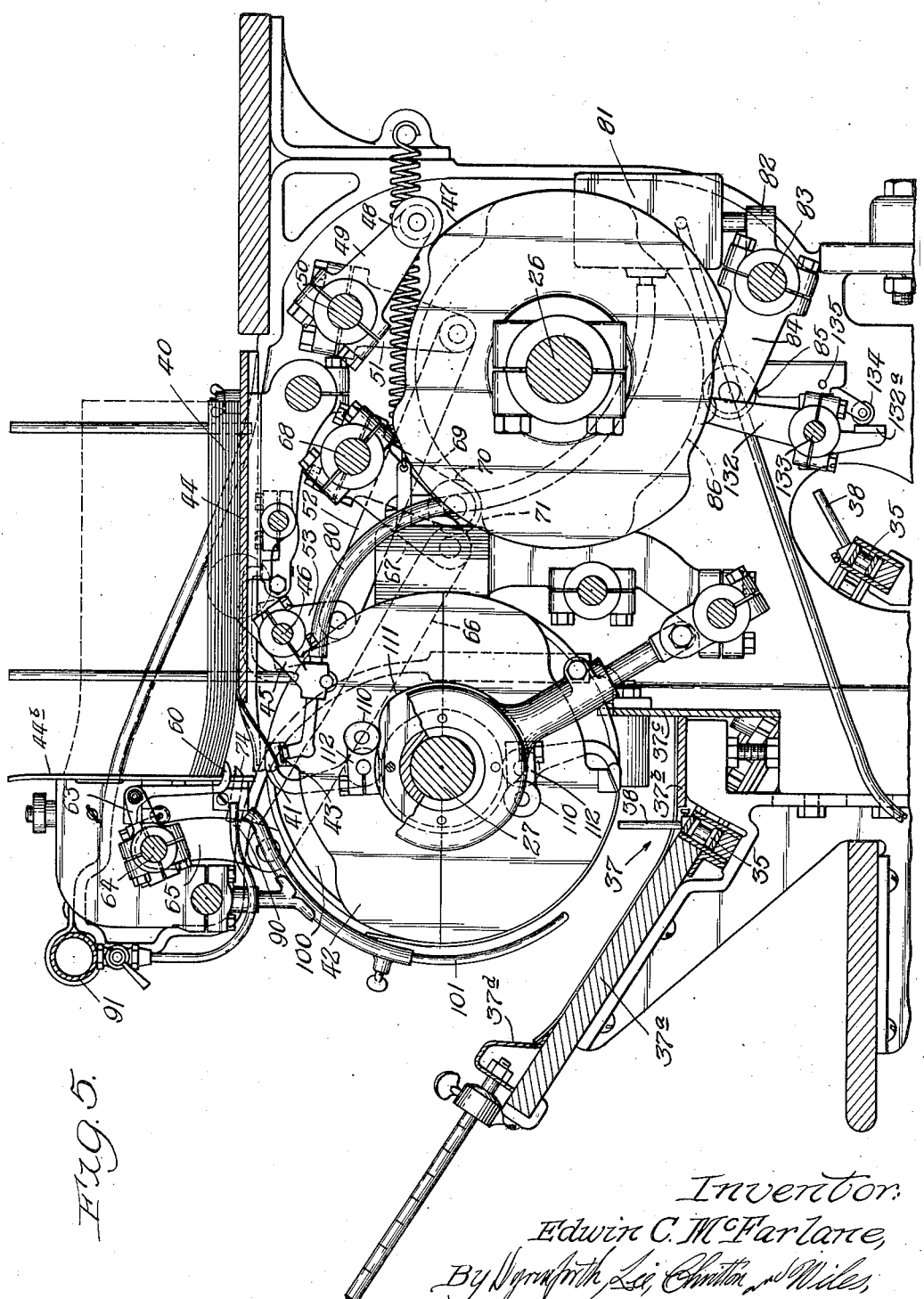

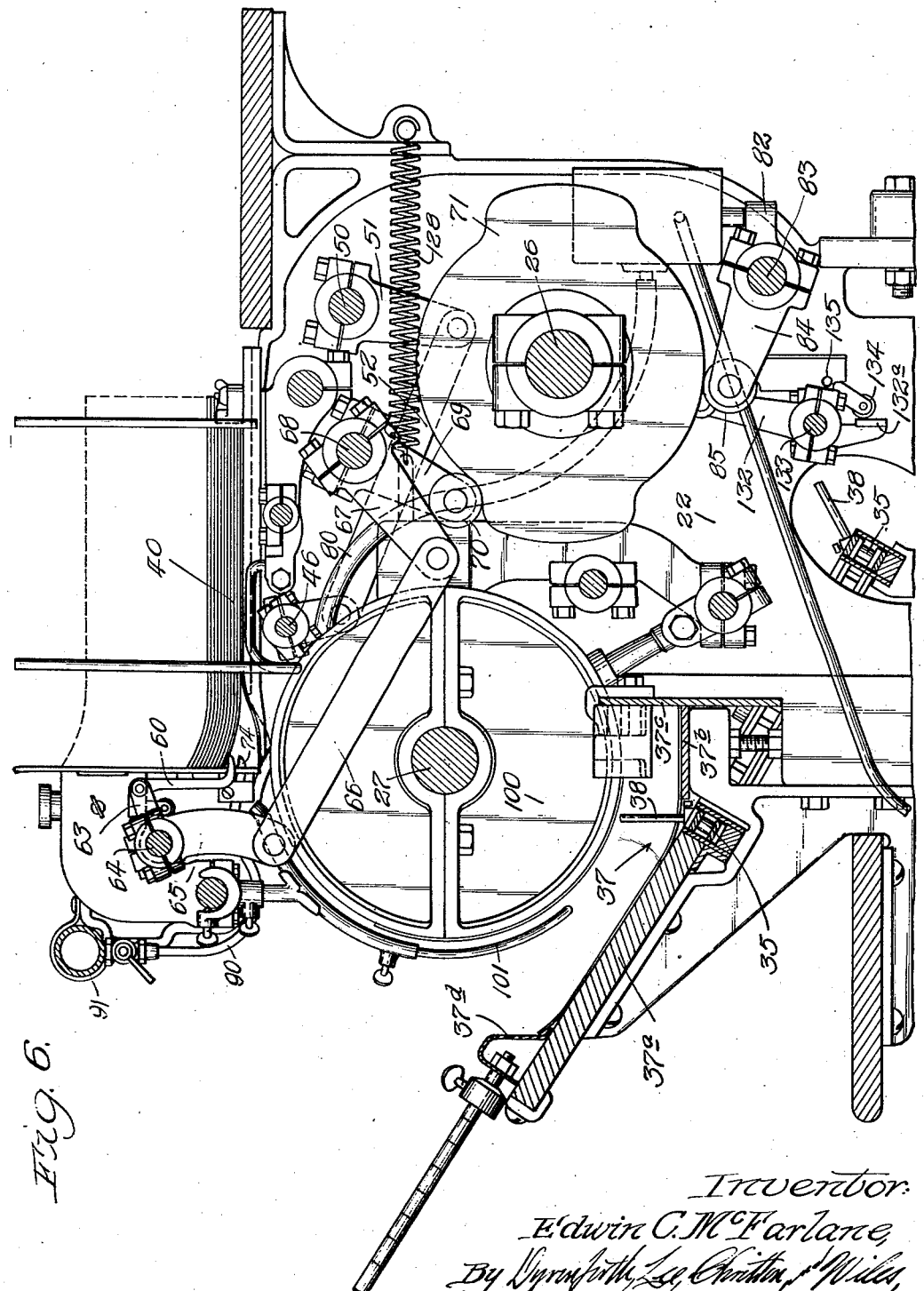

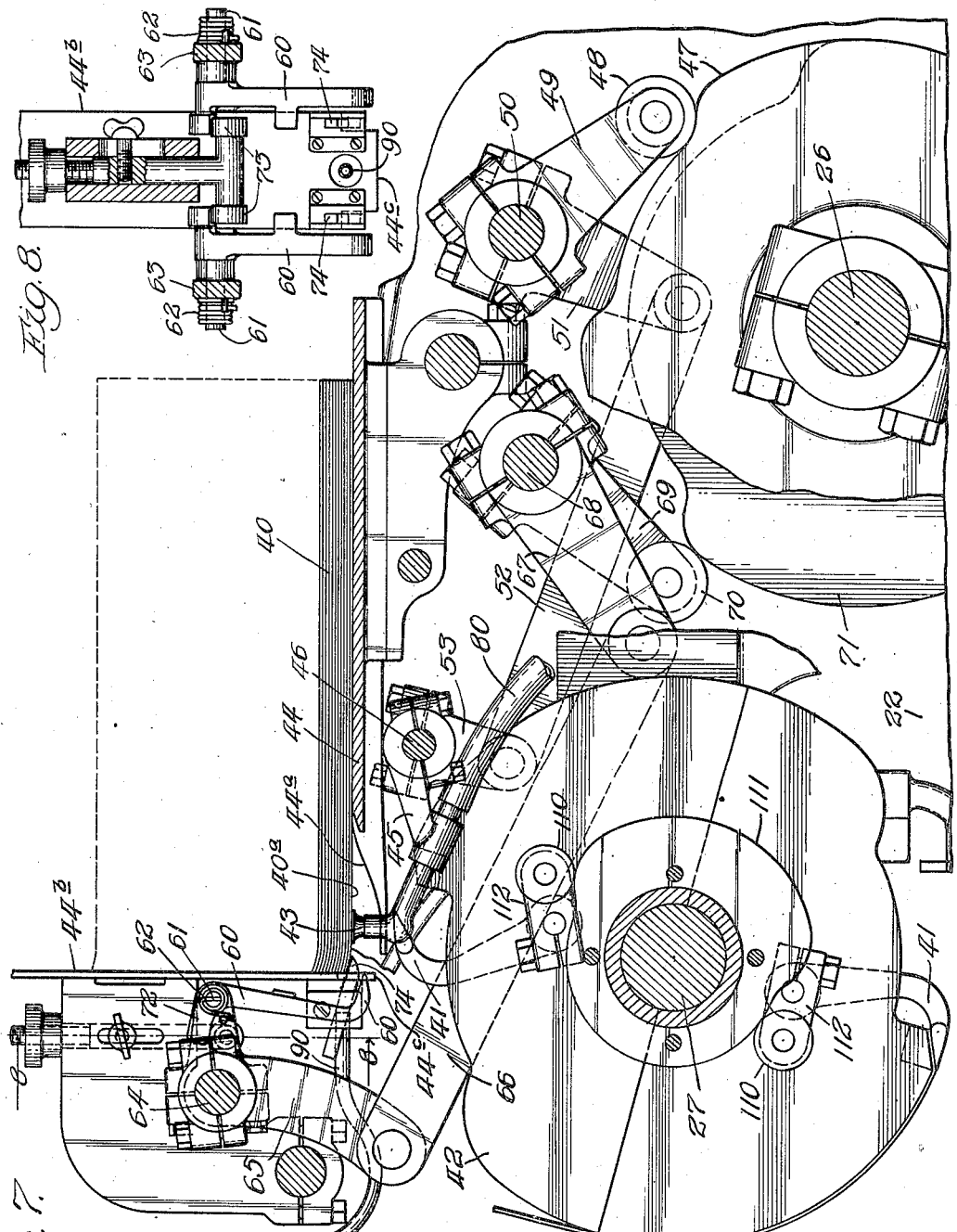

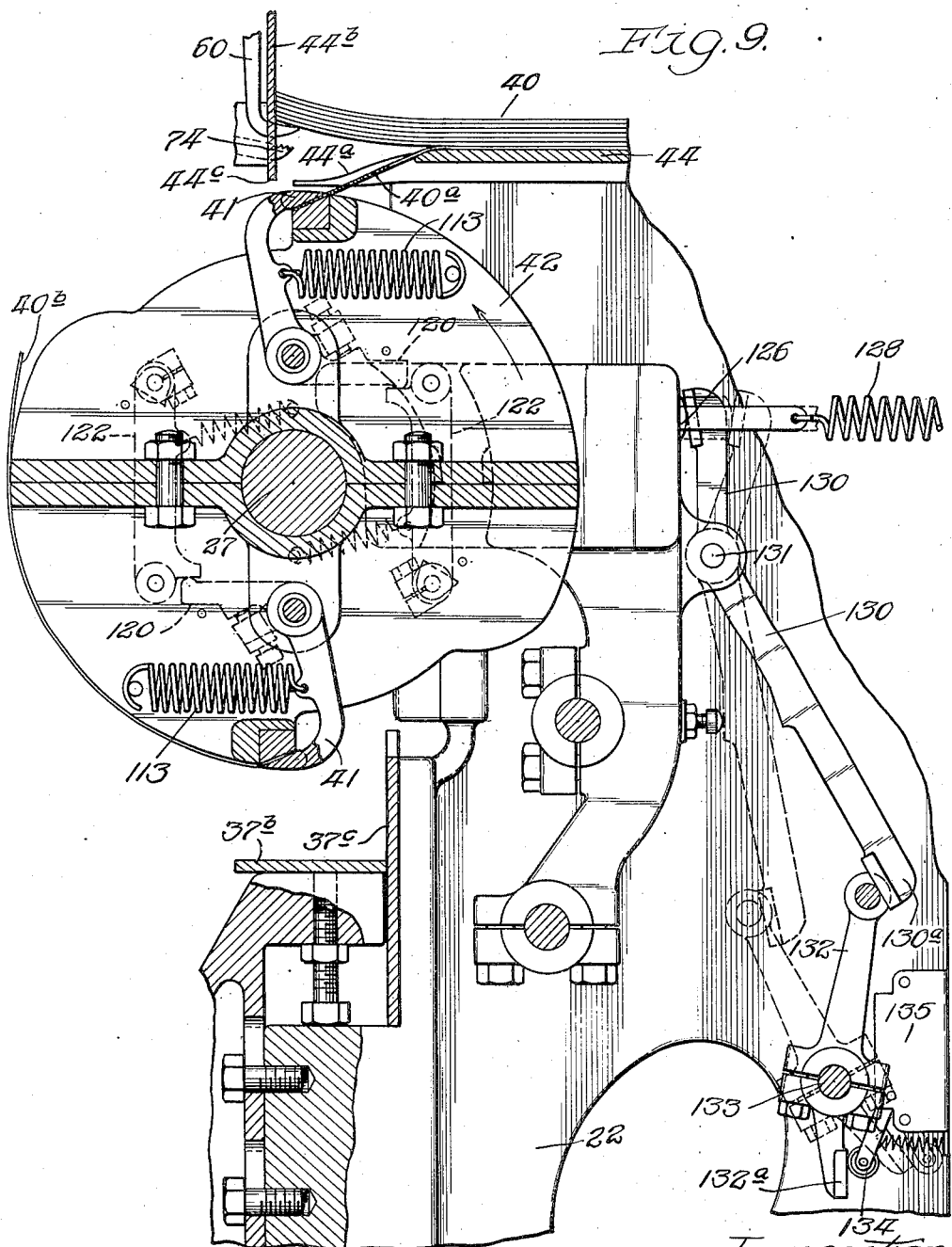

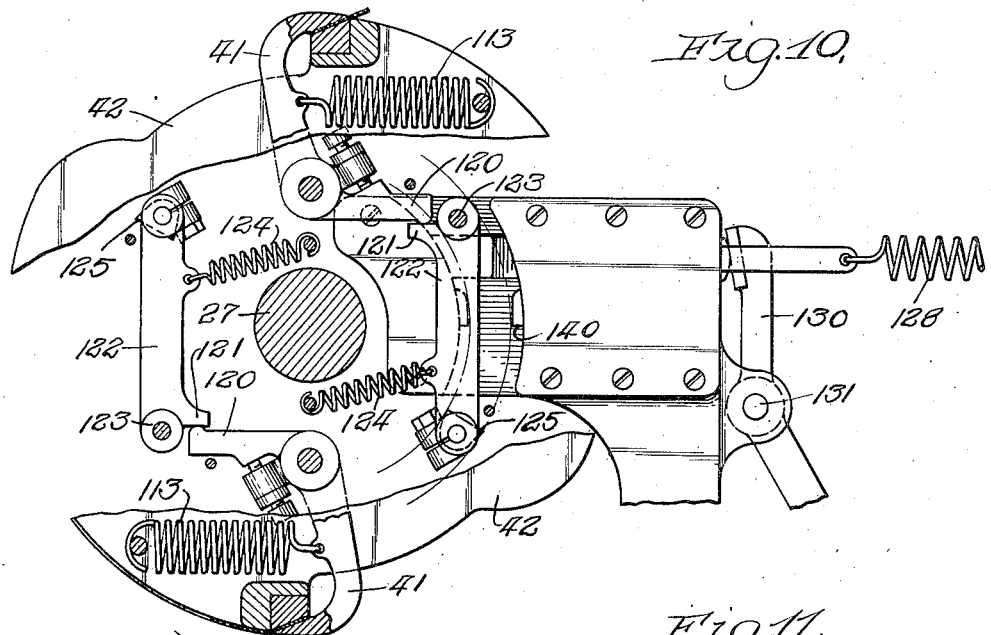
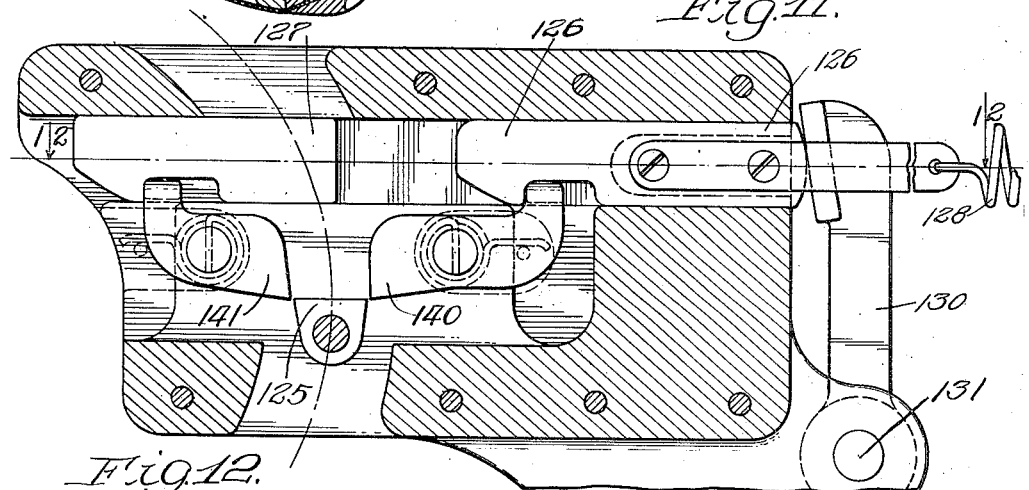
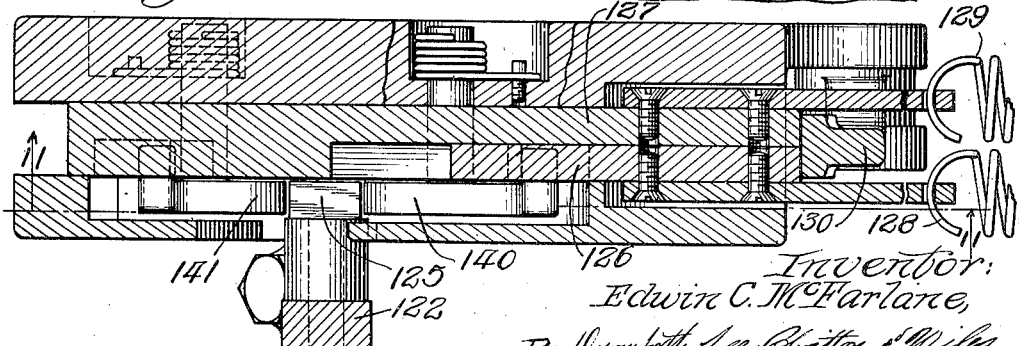

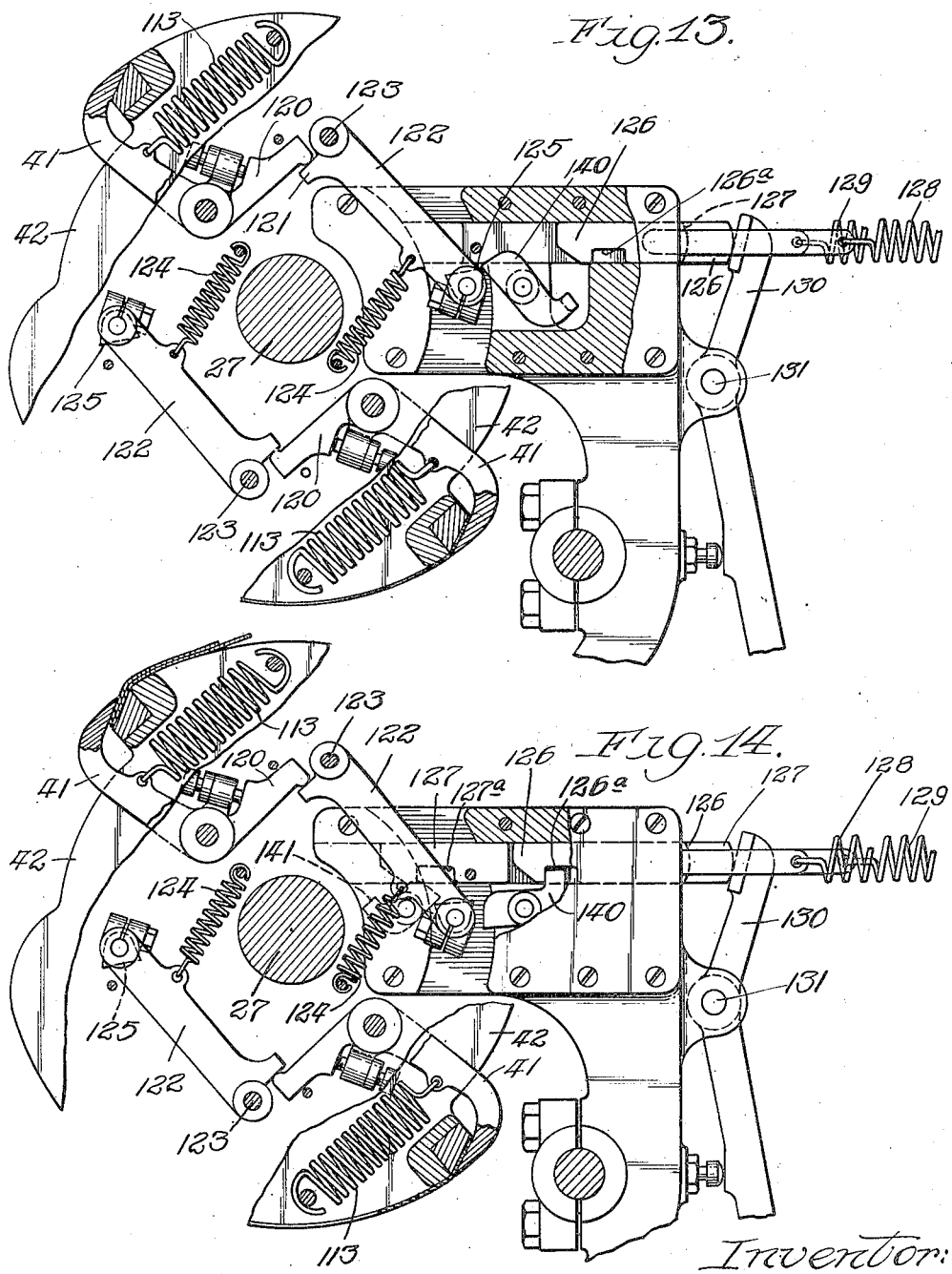

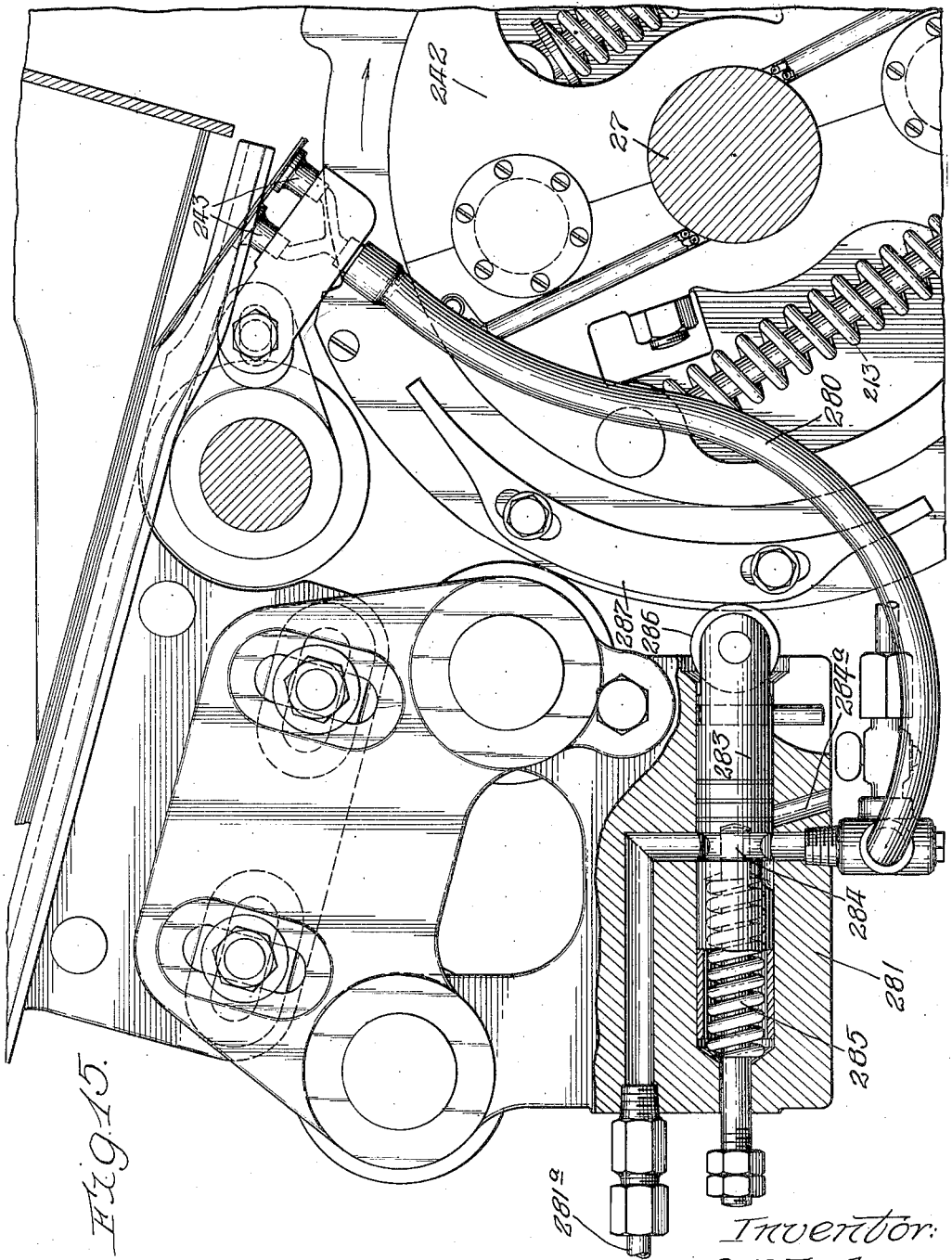

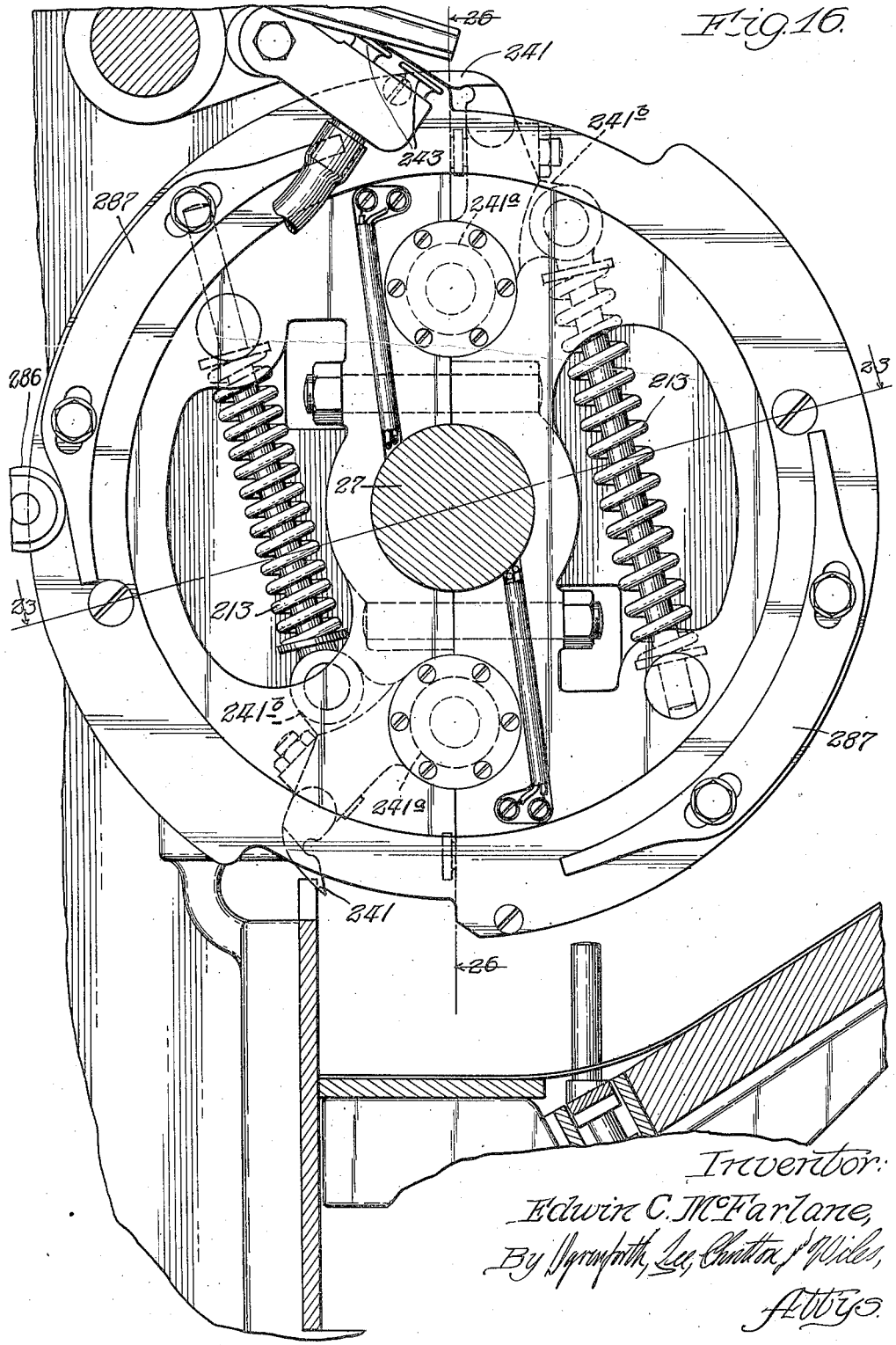

Jan. 31, 1939.     E. C. McFARLANE     2,145,520
GATHERING MACHINE
Filed March 11, 1937     17 Sheets-Sheet 12
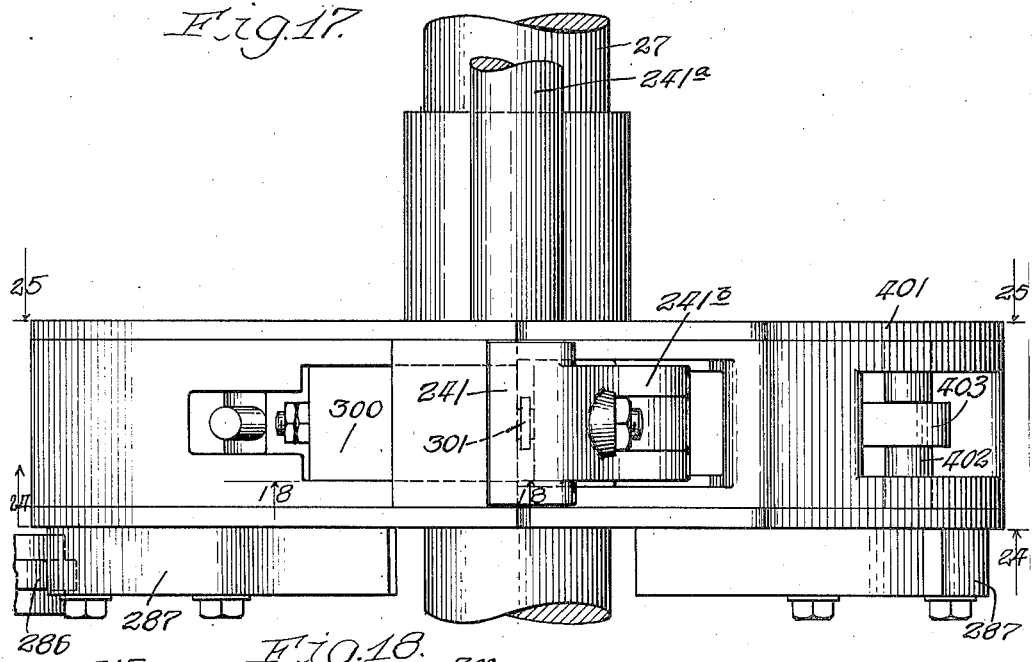
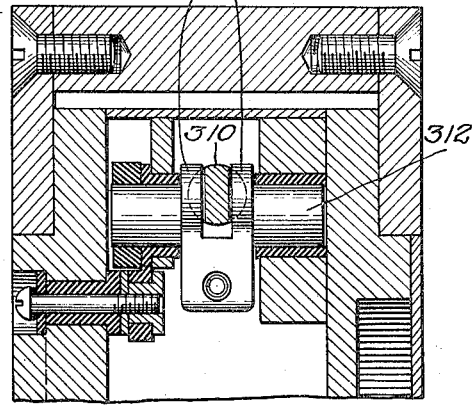
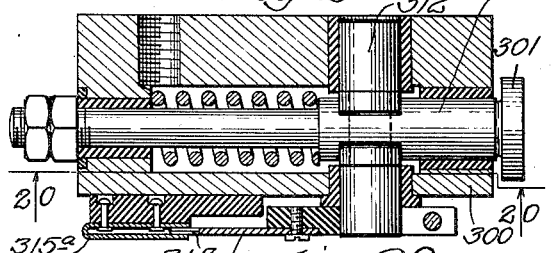
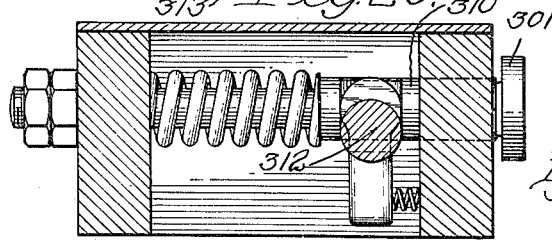

Jan. 31, 1939.   E. C. McFARLANE   2,145,520
GATHERING MACHINE
Filed March 11, 1937   17 Sheets-Sheet 13

Inventor:
Edwin C. McFarlane,
By Dyrenforth, Lee, Chritton & Wiles
Attys.

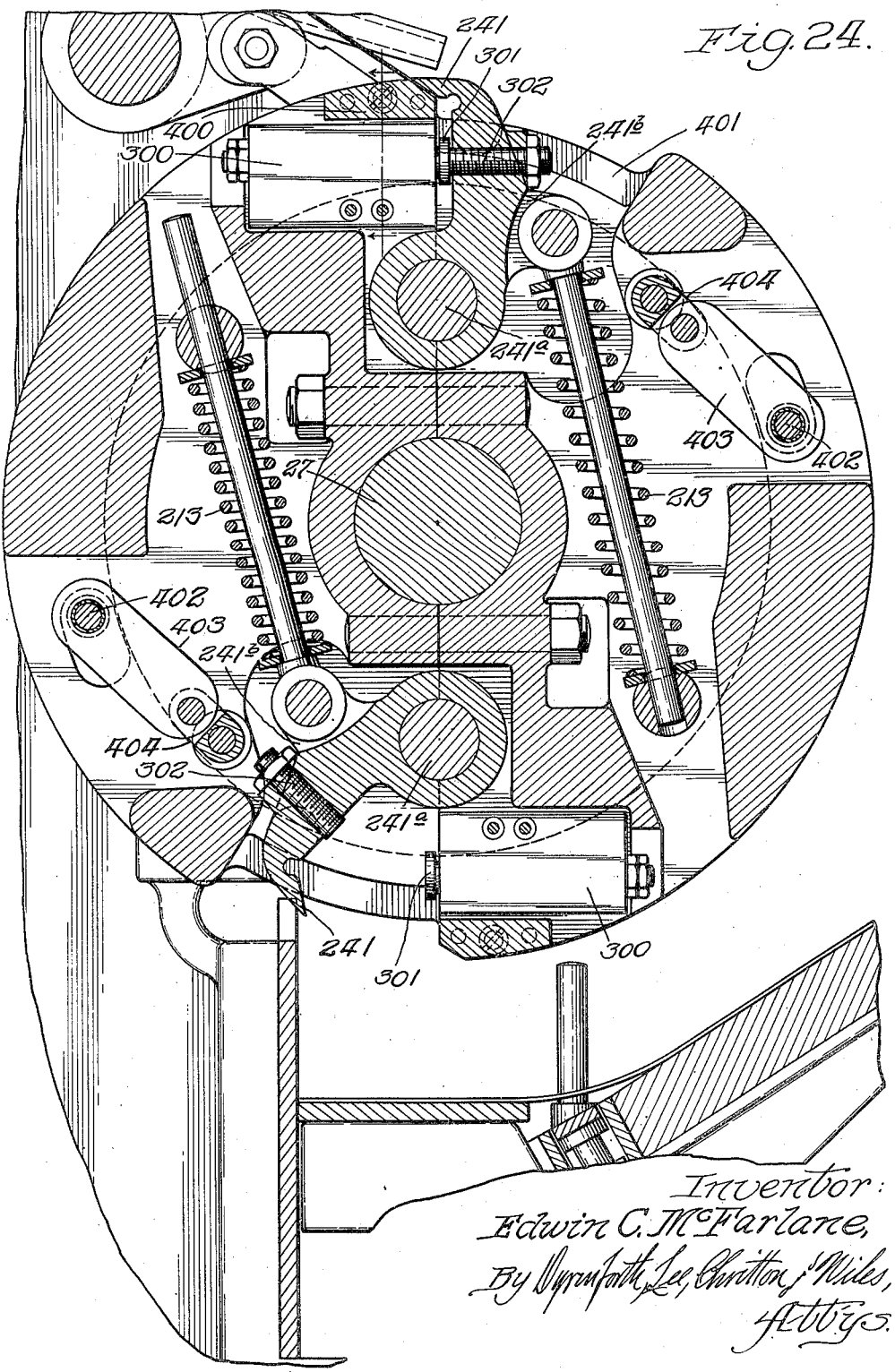

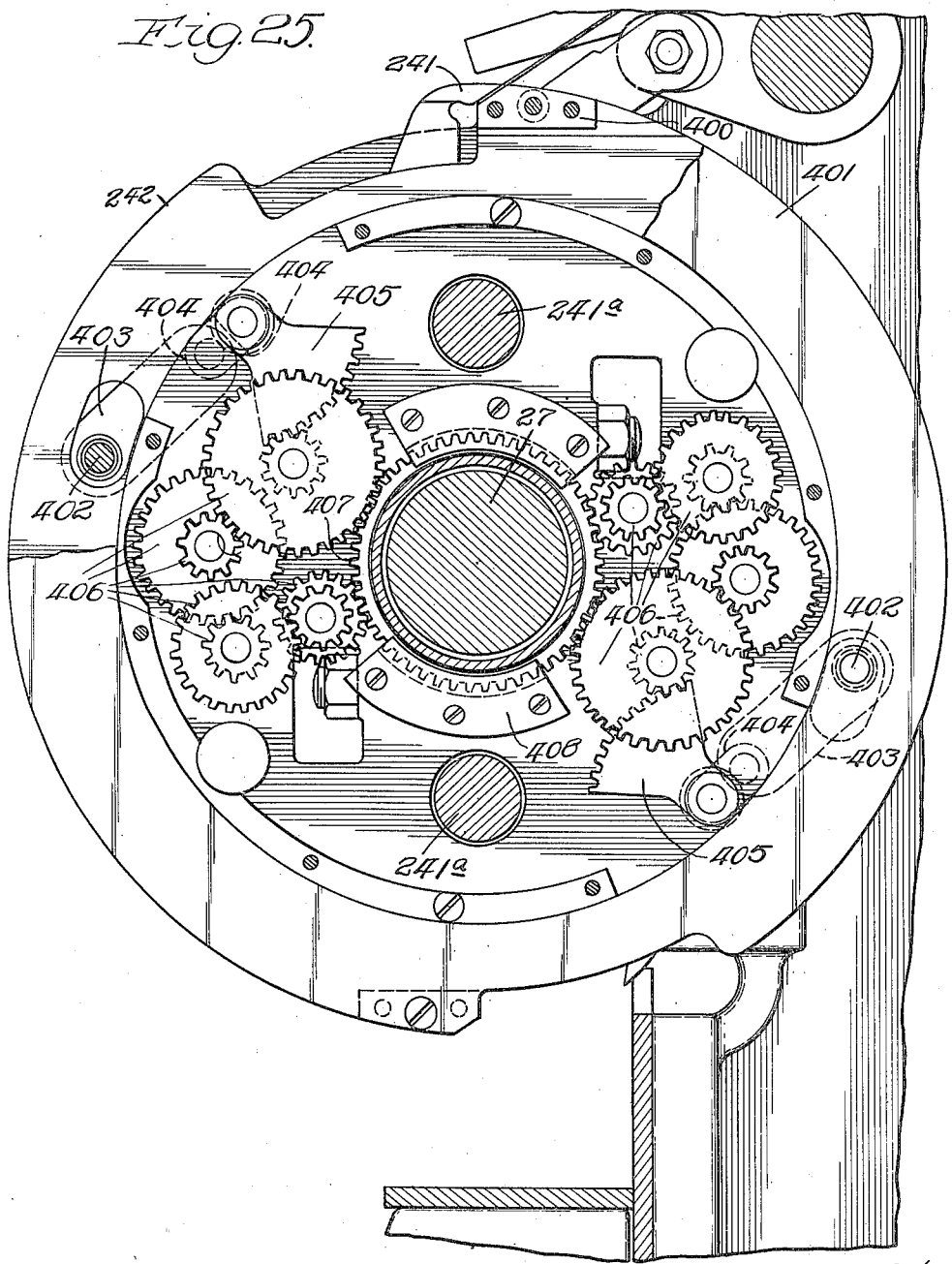

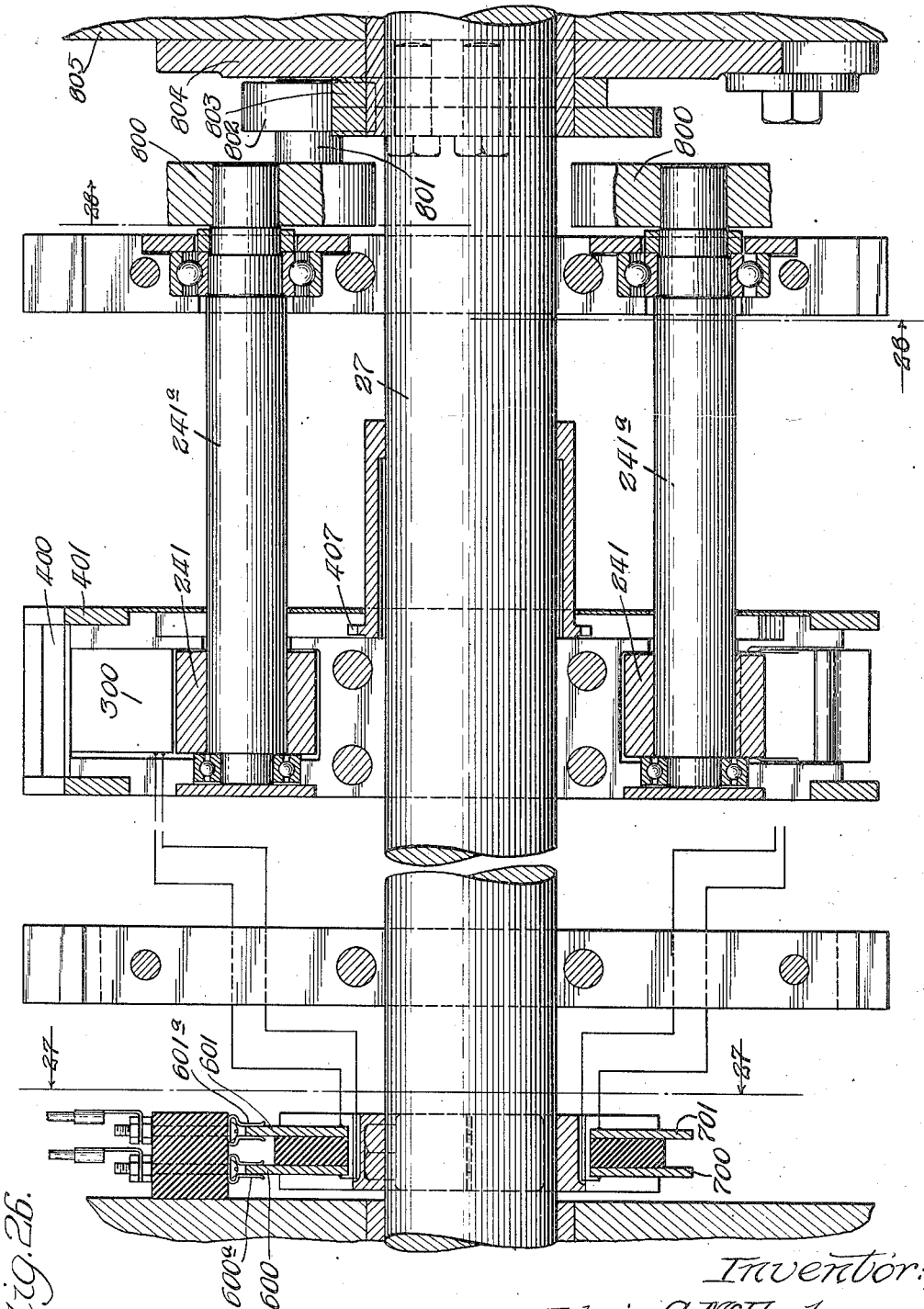

Jan. 31, 1939.  E. C. McFARLANE  2,145,520
GATHERING MACHINE
Filed March 11, 1937  17 Sheets-Sheet 17
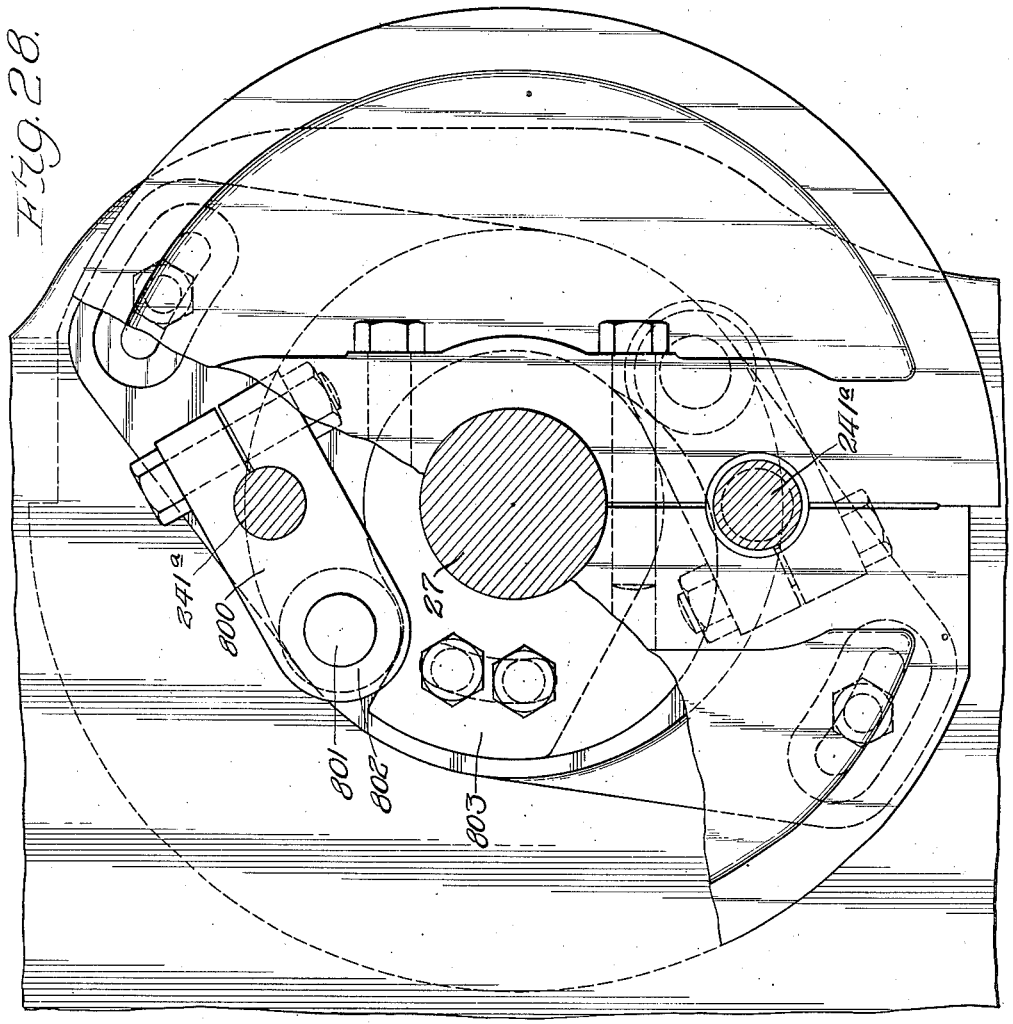
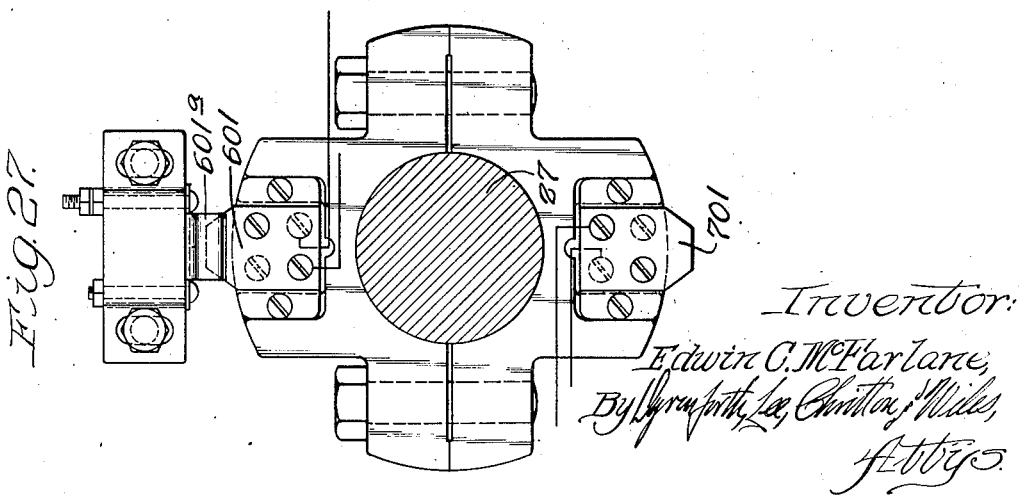

Patented Jan. 31, 1939

2,145,520

UNITED STATES PATENT OFFICE 2,145,520

GATHERING MACHINE

Edwin C. McFarlane, Pearl River, N. Y., assignor to Martin Machinery Corporation, New York, N. Y., a corporation of New York Application March 11, 1937, Serial No. 130,394

5 Claims. (Cl. 270—54)

This invention relates to improvements in gathering machines and more especially such a machine for gathering signatures, sheets, pages or the like, to form books. For convenience, I shall here consider the machine as operating upon signatures consisting of single flat sheets of paper although it is obvious that it will operate equally well upon sheets that are folded one or more times.

Among the features of my invention is the provision of such a machine employing a gripper cylinder adapted to take a signature from the bottom of a pile at a station and deliver it directly in the trough without the intervention of any feed rolls. This simplifies the construction and operations and speeds up the action of the machine.

Another feature of the invention is the provision of two diametrically arranged grippers on each cylinder. Although I have shown but two grippers on each cylinder it is to be understood that there may be three or more; and they would preferably be equally spaced about the circumference of the cylinder. By using a plurality of grippers on each cylinder, I am enabled to increase the diameter thereof and thus decrease the bending or curvature of the signature which is handled. This construction also promotes greater efficiency and speed of operation by utilizing practically the entire circumference of the cylinder in the handling of signatures. The speed of rotation of the cylinders is also reduced. For example, as here shown, two signatures are handled for each rotation of the cylinder.

Another feature of the invention is improved calipering or stop mechanism for quickly detecting any failure in the signature selecting mechanism and stopping operation of the machine when this occurs. This mechanism, for example, is designed to operate when a signature is missed at any station, or when two or more are taken at once instead of one, or even when a signature, defective because too thick or thin, is fed to the cylinder.

For the purpose of illustrating the invention I have shown in the drawings only two stations, but it is to be understood that there may be any desired number depending upon the number of different kinds of signatures that the machine is designed to handle.

Another feature of the invention is the provision of calipering mechanism employing the gripper of a gripper cylinder as the actuator thereof, thus dispensing with additional gauging rollers, fingers, or the like. This simplifies the construction and promotes the accuracy of the calipering mechanism.

Other features and advantages will appear more fully as I proceed with my specification.

In that form of device embodying the features of my invention shown in the accompanying drawings—

Figure 23:
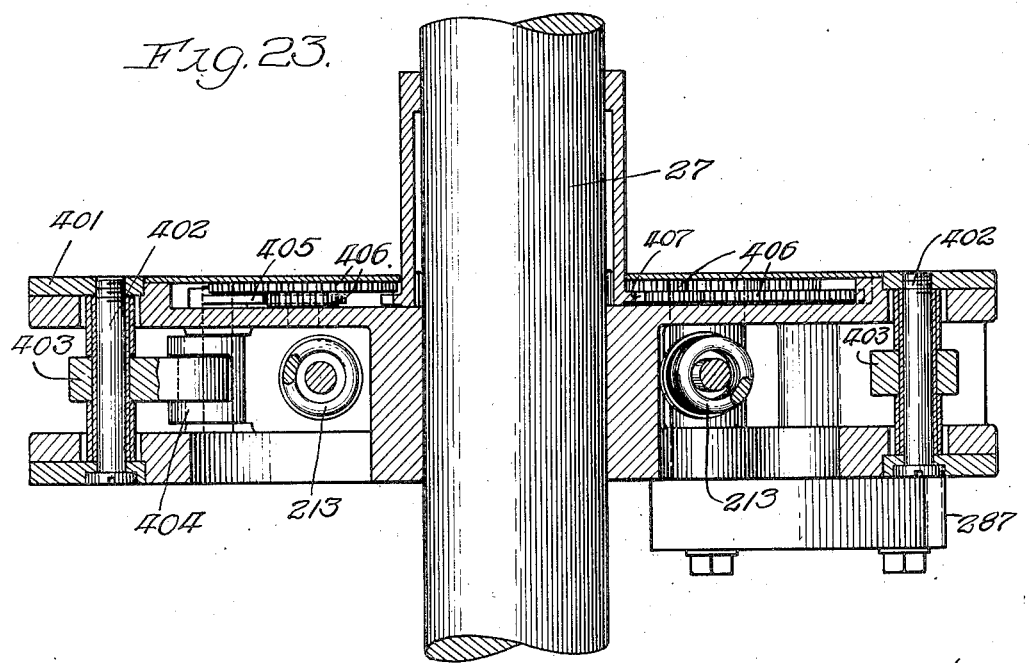

Fig. 1 is a view in rear elevation, showing a portion broken away to represent additional stations, Fig. 2 is a view in elevation of the end that may be termed the front end, Fig. 3 is a view in elevation of the rear or discharge end, Fig. 4 is an enlarged fragmentary view similar to Fig. 1, Fig. 5 is a view taken as indicated by the line 5—5 of Fig. 1, Fig. 6 is a view taken as indicated by the line 6—6 of Fig. 1, Fig. 7 is a view taken as indicated by the line 7—7 of Fig. 4, Fig. 8 is a view taken as indicated by the line 8—8 of Fig. 7, Fig. 9 is an enlarged view of a gripper cylinder and grippers, showing also some of the calipering mechanism, Fig. 10 is a view similar to Fig. 9, Fig. 11 is a view of the calipering mechanism taken as indicated by the line 11—11 of Fig. 12, Fig. 12 is a similar view taken as indicated by the line 12—12 of Fig. 11, Fig. 13 is a view of the calipering mechanism showing the operation thereof when a signature is missed, Fig. 14 is a similar view showing its operation when two signatures are gripped instead of one, Fig. 15 is a view showing a modified form of vacuum release, Fig. 16 is a view showing a modified form of control mechanism for the grippers, Fig. 17 is a top plan view of the gripper cylinder shown in Fig. 16, Fig. 18 is a view taken as indicated by the line 18 of Fig. 17, Fig. 19 is a view taken as indicated by the line 19 of Fig. 18, Fig. 20 is a view taken as indicated by the line 20 of Fig. 19, Fig. 21 is a view taken as indicated by the line 21 of Fig. 18, Fig. 22 is a diagrammatic view showing the wiring of a modified form of calipering mechanism, Fig. 23 is a view taken as indicated by the line 23 of Fig. 16, Fig. 24 is a view taken as indicated by the line 24 of Fig. 17, Fig. 25 is a view taken as indicated by the line 25 of Fig. 17, Fig. 26 is a view taken as indicated by the line 26 of Fig. 16, Fig. 27 is a view taken as indicated by the line 27 of Fig. 26, and Fig. 28 is a view taken as indicated by the line 28 of Fig. 26.

It may assist in the understanding of the invention to give a general description of the machine and its operation before explaining the details. The machine comprises a suitable base with end castings, or frame members, and one or more intermediate castings or frame members supporting the various shafts and tie rods. The machine has considerably more length than as shown in Fig. 1, because of the portion broken away. It may have, for example, as many as twenty or more stations. At each station in use, there is a pile or stack of signatures. Extending the full length of the machine below the stacks of signatures and back of them is a raceway or trough. Operating below the trough is a continuously moving conveyor chain with fingers or pushers extending up into it to engage signatures deposited in the trough and move them along toward the discharge end of the machine. At each station is a continuously rotating gripper cylinder adapted to deliver the signatures from the bottom of the stack to the trough. Sheet separating mechanism is employed to separate the sheets, one at a time from the bottom of the stack so that they may be engaged singly by the grippers on the gripper cylinder. The calipering mechanism is operated by the grippers to stop operation of the machine if a defective signature is gripped. By the term "defective signature", I mean to include a signature too thick or too thin, or too many signatures, or none at all. The mechanism is timed so that signatures at the first station are deposited one at a time in the trough. At the second station, a second signature is deposited on top of the first; and so at each subsequent station another signature is deposited on top of the group moving along in the trough below.

As shown in the drawings, 20 indicates the base, 21 the casting or frame member at the front end, 22 a similar member at the discharge end, and 23 similar intermediate members. As here shown there are two stations between the two members 22 and 23 shown.

24 indicates the driving motor, 25 the main drive shaft, 26 the main cam shaft and 27 the gripper cylinder shaft, all being driven by suitable sprockets and chains as shown. (See Fig. 2.) The shaft 25 carries a sprocket 28 driving the chain 29 which drives the sprocket 30 on the shaft 31 which operates through bevel gears 32, 33 to drive the large sprocket 34 carrying the conveyor chain 35, which also passes over the idler sprocket 36.

37 indicates in general the trough into which the signatures are delivered to be engaged by the fingers or pushers 38 on the conveyor chain 35. This trough is readily formed by the slanting shelf 37a and the horizontal shelf 37b. Between these two shelves is a space in which the conveyor chain 35 lies. 37c indicates the front wall of the trough against which the sheets are thrown when they are deposited in the trough by the gripper cylinders. The trough is also provided with an adjustable back wall 37d which is carried by the bars 38 which are adjusted backwardly or forwardly in the supports 39 depending upon the width of the signatures handled.

*Signature separating mechanism*

Mechanism is provided at each station for separating the bottom signature 40a from the stack 40 so that it may be gripped by the gripper 41 on the gripper cylinder 42 (to be hereinafter described). This separating mechanism includes a pair of reciprocating suckers 43 adapted to engage the underside of the rear edge of the bottom signature projecting beyond the support 44 and pull it downwardly to snap under and be engaged by the gripper 41 on the rotating drum or cylinder 42. The gripper is caused to close immediately and the signature is thus pulled from the bottom of the stack.

The suckers 43 are carried by the arms 45 mounted on the shaft 46 which is oscillated by the cam 47 on the shaft 26, operating through the cam wheel 48, lever 49, rock shaft 50, lever 51, link 52, and lever 53 on the shaft 46.

To assist in separating the bottom signature from the rest, is provided a pair of lift hooks or fingers 60 at each station. These hooks are swingably mounted on the shafts 61 and are yieldingly urged forwardly by special springs 62. The shafts 61 are carried on the ends of arms 63 mounted on the shaft 64. The arms 63 are rocked to raise and lower the hooks 60. This is accomplished by connecting to the shaft 64 the depending lever 65 connected through the link 66 to the lever 67 mounted on the rock shaft 68. The shaft 68 carries another lever 69 with a cam roller 70 operating on the cam 71 on the shaft 26. The hooks 60 are provided with rearwardly extending arms 72 adapted to engage the vertically adjustable stationary rollers 73 when the hooks are lowered. This causes them to be retracted as shown in Fig. 7. When they are up they project under the rear edges of the stack and lift them somewhat as shown in Fig. 6. 74, 74 indicate a pair of additional adjustable stationary fingers or separators at each station projecting slightly under the rear edges of the stack of signatures.

The rear edge of the support 44 is provided with a sloping extension 44a provided with a recess to accommodate the suckers 43.

Air is exhausted from the suckers through the hose 80 leading to the vacuum valve 81, details of which are not shown. This valve is operated by the arm 82 on the rock shaft 83 which is oscillated by the arm 84 carrying the cam roller 85 operating on the cam 86 on the shaft 26. Suction is turned on as the sucker engages the bottom signature and shut off just before the gripper takes hold. The hooks 60 are lowered and retracted just before the sucker takes hold of the signature.

90 indicates a nozzle adapted to supply a continuous jet of air against the rear edges of the signatures to assist in separating them. 91 is a pipe to supply compressed air to the nozzles 90.

*Signature feeding mechanism*

As stated before there is a gripper cylinder 42 at each station to feed the signatures from the stack to the trough. At each side of the cylinder is a sheet supporting disk 100 to support the edges of the sheet. 101 indicates adjustable curved guide bars adjacent these disks to assist in directing the signatures into the trough 37.

The grippers 41 on the cylinder 42 are operated by the cam rollers 110 working on the stationary cam 111. The rollers 110 are mounted on the arms 112 attached to the grippers 41 which are yieldingly held closed by the springs 113.

The gripper 41 engages the edge of the sheet as it is released by the sucker and the cylinder withdraws it from the bottom of the stack and discharges it into the trough, the gripper releasing it at the proper time.

Calipering or stop mechanism

This mechanism is well shown in Figs. 9 to 14. The gripper 41 is provided with a lever 120 the end of which engages the short arm 121 of a bell-crank having a long arm 122. The bell crank is pivoted at 123 and a relatively weak spring 124 holds the arms 120 and 121 together. The free end of the arm 122 carries a tripper 125.

126 and 127 indicate bars slidably mounted and urged outwardly by the springs 128 and 129 respectively. When either of these bars is released it is pulled out to engage the upper end of the rock lever pivoted at 131 and cause the lower end 130a to strike the rock lever 132 pivoted at 133 to rock said lever to cause its lower end 132a to engage the switch arm 134 of the power shut off switch 135 and stop operation of the machine.

The bars 126 and 127 are provided with notches 126a and 127a normally engaged by the pivoted release triggers 140 and 141 to hold said bars in. The inner ends of the triggers 140 and 141 are separated just far enough to let the tripper 125 pass between when said tripper is in its normal position. That is, when the gripper is in its normal closed position or has a perfect or normal signature as shown in Fig. 10. In this case the tripper 125 will pass freely between the triggers 140 and 141 as shown in Fig. 11 without engaging either and therefore without releasing either bar 126 or 127. In the event the gripper is in an abnormal closed position (too far closed) that is, if no signature is engaged as shown in Fig. 13, or if the signature is too thin, the tripper 125 will be rocked sufficiently to engage the trigger 140, rock it, and release the bar 126 to stop the machine. In the event the gripper is in an abnormal closed position (too far open) with two or more signatures engaged as shown in Fig. 14, or if the signature is too thick, tripper 125 will engage the trigger 141 to release the bar 127 and stop the machine.

The support 44 is provided with a rear wall 44b with its lower edge 44c terminating a short distance above the gripper cylinder 42.

In Fig. 9, 40b indicates a signature held by the gripper 41 on the cylinder and just about to be released and discharged into the trough.

I shall now describe the modifications shown in Figs. 15 to 28, inclusive. These modifications include primarily another form of vacuum release valve, a different form of spring for the gripper, and an electrical calipering mechanism. Attention in the description will be directed principally to the changes or modifications from the apparatus already described, it being understood that the other parts of the apparatus shown in these Figs. 15 to 25 inclusive are substantially the same in construction and operation as those already described.

In Fig. 15 the suckers 243 are shown resembling the suckers 43 heretofore described. 280 indicates the suction line to these suckers. This suction line leads to the valve box 281 connected to the main suction line 281a connected to the exhausting mechanism (not shown). Inside of the valve box 281 is a piston valve 283 with a port or recess 284 adapted to establish communication between the lines 280 and 281a when in its open positon. The valve 283 is yieldingly held closed by the spring 285. The end of the valve 283 carries a roller 286 engaged by the cam 287 on the gripper cylinder 242. This construction is designed to give a quicker and more accurately timed release of the vacuum than can be accomplished by the use of the lever 84 operated by the cam 86. The valve 283 is shown open in Fig. 15 to connect the suckers to the suction. When it closes it vents the suckers to atmosphere through the vent 284a.

In Fig. 9, as described above, I have shown the grippers 41 operated by the tension springs 113. It is to be understood, however, that these grippers may be operated by compression springs, torsion springs or any other suitable means. For example, in Figs. 16 and 24, I have shown the grippers 241 corresponding to the grippers 41 but operated by compression springs 213 instead of tension springs 113. The grippers 241 oscillate on the shafts 241a and are provided with arms 241b against which the springs 213 operate. The shaft 241a is extended and provided with a crank 800 having a crank pin 801 carrying a cam roller 802 operating on the cam 803 carried by the member 804 adjustably mounted on the stationary frame member 805. The member 804 can be rotatably adjusted to move the cam 803 to change the timing of the grippers.

In the earlier part of the specification I described the calipering or stop mechanism shown in Figs. 9 to 14. A modified form of calipering or stop mechanism is shown in Figs. 17 to 28. In this form of mechanism the control is primarily electrical. Each gripper cylinder carries a switch controlled by each gripper. When the gripper shows the correct thickness of sheets, the switch remains open. When the sheets are too thick or too thin, however, the switch on the gripper cylinder is closed to close a circuit to operate a solenoid to open the switch to shut off the power to stop operation of the machine. This switch also can be adjusted to give a fine or coarse adjustment.

I shall now describe more in detail the calipering or stop mechanism shown in Figs. 17 to 28. 300 indicates a block on the gripper cylinder carrying the electric switch controlled by the button 301 adapted to be engaged by the adjustable screw 302 mounted in the gripper 241. The details of the switch are shown more clearly in Figs. 18 to 21. In general it may be stated that the switch has a neutral position in which it is held when the gripper holds the correct number of sheets or sheets of the correct thickness. When in this neutral position the circuit is open. In the event that the gripper engages too many sheets or too few sheets, or sheets too thick or too thin, the switch is closed, closing the circuit to shut off the power and stop the machine. The button 301 is carried on the end of a spring pressed plunger 310 provided with recesses embracing the arms 311 on the rock shaft 312. The shaft 312 carries the bifurcated switch arm 313 with the contacts 314, 314. The block 300 carries the two outer stationary contacts 315, 315, and the center stationary contact 315a. In the neutral position shown in Fig. 18 the contacts 314 lie between the contacts 315 and the switch is open. In case the shaft 312 rocks in either direction one of the contacts 314 closes with the center contact 315a. This is the fine adjustment. Further swinging of the contacts 314 will cause them to close with the outer contacts 315. These are spaced somewhat farther away to give a coarse adjustment. The outer contacts 315 are connected to the contactor 600 on the shaft 27, and the center contact 315a is connected to the contactor 601 on the shaft 27. Adjacent the shaft 27, and in the path of the contactors 600 and 601, are bifurcated stationary contactors 600a and 601a, respectively. 600a is connected to 317a of the switch 318, and 601a is connected to 317 of the switch 318. In rotation of the shaft 27, the rotating contactors 600 and 601 make engagement with the stationary contactors 600a and 601a, respectively. It will be seen, therefore, that only when such engagement is made, can the calipering mechanism be operated. At other times, the circuits are open because of separation of these contactors. It will be seen also by reference to Fig. 22 that the switch 318 can be used to render either the coarse or fine adjustment operative. For example, when the switch 318 is in engagement with the contact 317, the center contact 315a of the switch 300 is rendered operative to give the fine adjustment. In case the switch 318 is moved over to the contact 317a, the outer contacts 317 on the switch 300 are rendered operative to give the coarse adjustment. The contacts 600—600a and 601—601a are adapted to be closed only at the time that the grippers are in closed position holding the sheets, at which time the calipering is accomplished. At all other times the contacts 600—600a and 601—601a are open so that the calipering mechanism will not operate at the time the grippers are opening or closing to release or to take signatures. It is to be noted also that the time of contact between the members 600—600a and 601—601a is relatively short, so that in the event an incorrect thickness of sheets is engaged, and the switch 300 operates the shut-off to stop operation of the machine, the machine, by its momentum, will coast a sufficient distance to again open the contacts 600—600a and 601—601a so that the machine can again be started. 323 indicates a source of electrical energy, and 324 indicates a ground to the contacts 314 on the switch arm 313. When the circuit is completed, the solenoid 322 is energized to open the switch 325 to shut off the power.

In connection with each cylinder, it is to be understood that there is another pair of contactors 700 and 701 diametrically opposite to the contactors 600 and 601 connected to the calipering device on the other gripper. The details of this are not shown.

Means are provided for adjusting the grippers to engage different thicknesses of material. This adjustment is accomplished by moving the anvils 400 against which the grippers 241 operate. These anvils are mounted on adjustable rings 401 connected by pins 402 engaged by links 403 connected to levers 404 carried by the quadrants 405 adapted to be operated through a train of gears 406, by means of adjustment of the central gear 407 held in its adjusted position by the flexible locking plates 408. By this construction the anvils 400 may be simultaneously adjusted toward or away from the grippers 241.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I claim as new, and desire to secure by Letters Patent, is:

1. A machine of the character described, including: a support for a stack of signatures; a trough below the support; conveyor means operating in the trough; means for separating the edge of a bottom signature from a stack on the support; a continuously rotating member; a gripper on the rotating member; means for operating the gripper and rotating member to grip the edge of a bottom signature separated from the stack, withdraw it from the stack, and deposit it in the trough; stop mechanism controlled by a release trigger; and a tripper controlled by the gripper and adapted to engage the release trigger when the gripper is in an abnormal closed position.

2. A machine as claimed in claim 1, having two release triggers, one adapted to be engaged by the tripper when the gripper is in an abnormal closed position too far open, and the other when the gripper is in an abnormal closed position too far closed.

3. A machine as claimed in claim 1, in which the rear edge of the support has a sloping extension with a recess for the sucker.

4. A machine of the character described, including: a support for a stack of signatures; conveyor means; means for separating the edge of a bottom signature from a stack on the support; a rotating member; a plurality of grippers on the rotating member; and means for operating the grippers and rotating member to cause each gripper to grip the edge of a bottom signature separated from the stack, withdraw it from the stack, and deliver it to the conveyor means, whereby a plurality of signatures are handled at each rotation of said rotating member.

5. A machine of the character described, including: a support for a stack of signatures; a trough below the support; conveyor means operating in the trough; means for separating the edge of a bottom signature from a stack on the support; a continuously rotating substantially cylindrical member; a plurality of grippers on the rotating member; and means for operating the grippers and rotating member to cause each gripper to grip the edge of a bottom signature separated from the stack, withdraw it from the stack, and deliver it to the trough, whereby a plurality of signatures are handled at each rotation of said rotating member.

EDWIN C. McFARLANE.